United States Patent [19]
Ashfield et al.

[11] 4,295,530
[45] Oct. 20, 1981

[54] LOWER LINK DRAFT SENSING SYSTEM ON TRACTOR

[75] Inventors: Herbert E. Ashfield; Harry Horsfall; Philip M. Wade, all of Huddersfield, England

[73] Assignee: David Brown Tractors Limited, Huddersfield, England

[21] Appl. No.: 133,190

[22] Filed: Mar. 24, 1980

[30] Foreign Application Priority Data

Mar. 30, 1979 [GB] United Kingdom ............... 11309/79

[51] Int. Cl.² .......................................... A01B 63/112
[52] U.S. Cl. ....................................................... 172/7
[58] Field of Search ..................... 172/7, 9, 8, 10, 11, 172/12; 280/446 A

[56] References Cited

U.S. PATENT DOCUMENTS

| | | | |
|---|---|---|---|
| 3,342,274 | 9/1967 | Wridt, Jr. | 172/7 |
| 3,375,876 | 4/1968 | Engelmann | 172/7 X |
| 3,399,733 | 9/1968 | North | 172/9 |
| 3,527,305 | 9/1970 | Dollase | 172/9 |
| 4,059,159 | 11/1977 | Moorhouse et al. | 172/7 |

FOREIGN PATENT DOCUMENTS

| | | | |
|---|---|---|---|
| 2234839 | 1/1975 | France. | |
| 1304261 | 1/1973 | United Kingdom | 172/7 |

*Primary Examiner*—Richard T. Stouffer

[57] ABSTRACT

Tractor hydraulic power lift mechanisms may have automatic draft control signals fed back to them from lower link draft force sensing systems. One such system has two bowed rearwardly-extending leaf springs anchored to the tractor frame at their front ends, two laterally-spaced arms pivoted at their upper ends to the tractor frame and at their lower ends to the rear ends of the respective springs, a cross-bar universally supported by the lower ends of the respective arms and having two attachment points laterally offset from said arms to which the front ends of respective lower hitch links are universally connectible, and linkage for deriving a control signal from the fore and aft displacement of the mid-point of the cross-bar. However, the cross-bar is stressed in bending to the detriment of the control signal accuracy. To avoid this, a summating bar is universally connected between said arms and the control signal derived from a point on the unstressed summating bar.

6 Claims, 6 Drawing Figures

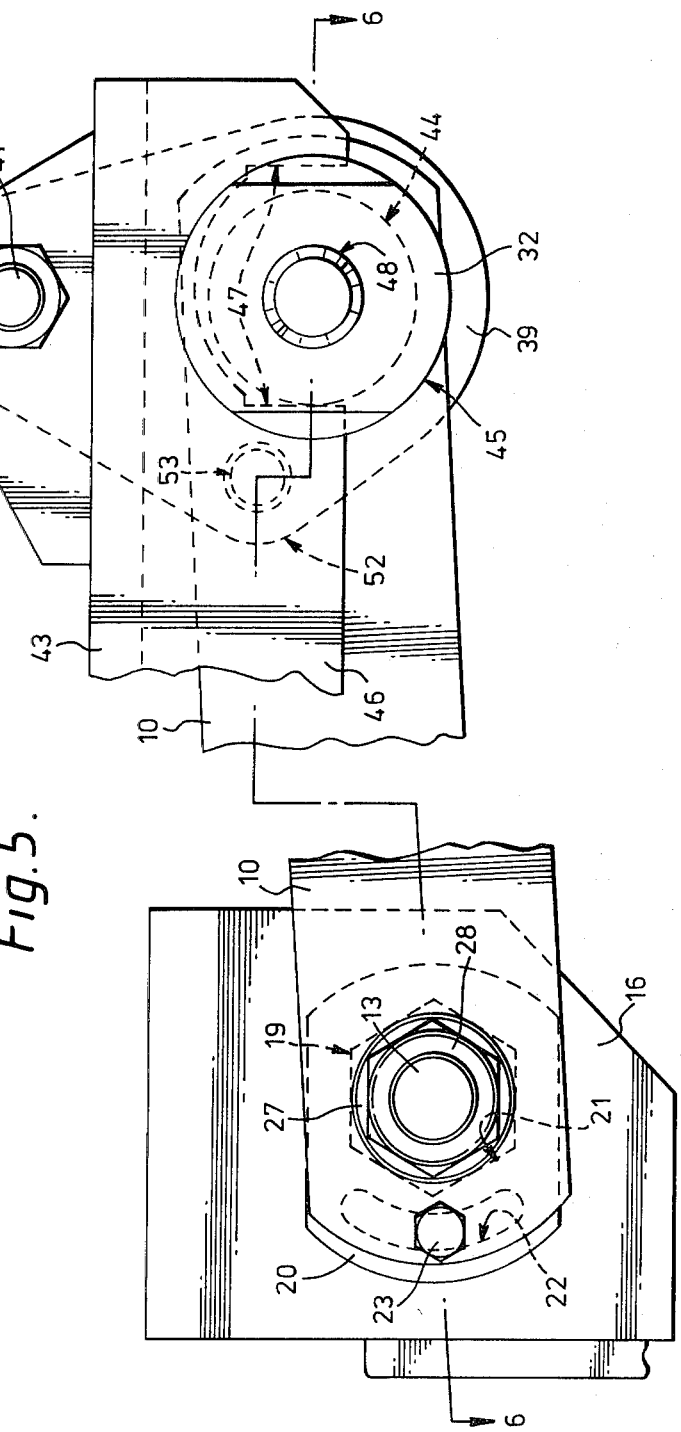

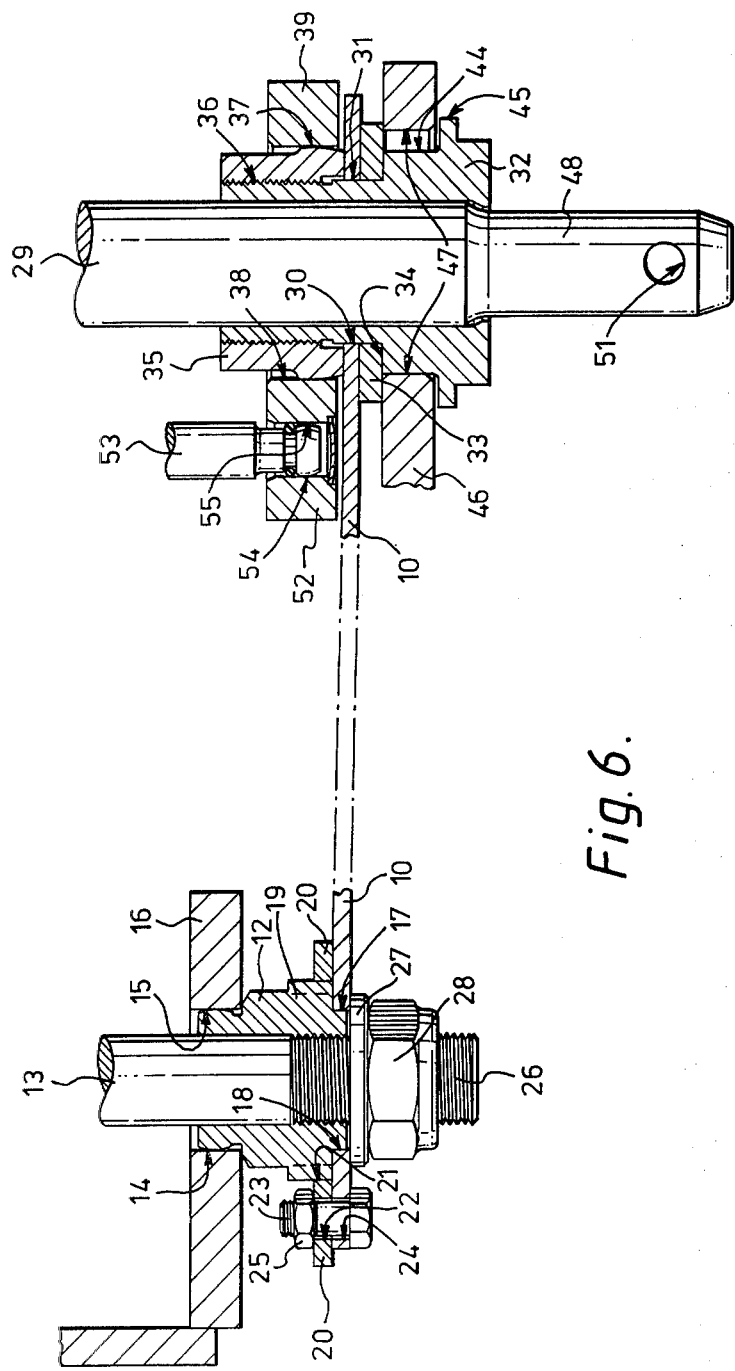

LOWER LINK DRAFT SENSING SYSTEM ON TRACTOR

BACKGROUND OF THE INVENTION

The invention relates to a lower link draft sensing system, for an agricultural tractor having a hydraulic power lift mechanism, of the kind including two bowed rearwardly-extending leaf springs anchored to the tractor frame at their front ends, two laterally-spaced arms pivotally connected at their upper ends to the tractor frame and at their lower ends to the rear ends of the respective springs, and two lower hitch links universally connected at their front ends to the lower ends of the respective arms. The lower hitch links are adapted in conventional manner to be universally connected at their rear ends to an agricultural implement, and the draft force exerted on the tractor by the implement when in work places the springs in tension and causes them to elongate in a rearward direction. Due to the asymmetrical draft force exerted by many implements, for example ploughs, the tension in and consequent elongation of one spring often differs from the tension in and consequent elongation of the other spring. Various methods have been proposed for continuously sensing the effect of the draft force on the springs and transmitting a feed-back signal related to said force to the power lift mechanism so as to cause said mechanism to vary automatically the working depth of the implement and thereby maintain the draft force substantially constant.

In one such method, the front ends of the lower hitch links are universally connected to points at or near the respective ends of a cross-bar secured between the rear ends of the respective springs, said cross-bar being universally supported by the lower ends of the respective arms and said points being laterally offset from, that is to say either outboard or inboard of, the arms. In order to obtain a draft signal related to the average value of the tensions in the respective springs, said signal has been derived from the fore and aft displacement of the mid-point of said cross-bar. However, we have found that due to the connection of the lower hitch links to said laterally offset points on the cross-bar, the cross-bar is stressed in bending and this has a detrimental effect on the accuracy of the draft signal.

The principal object of the present invention is to avoid this disadvantage.

Another object is to provide a system of the kind referred to and having no cross-bar with means from which a draft signal accurately related to the draft force can readily be derived.

SUMMARY OF INVENTION

According to the invention, a lower link draft sensing system, for an agricultural tractor having a hydraulic power lift mechanism, comprising two bowed rearwardly-extending leaf springs anchored to the tractor frame at their front ends and adapted to elongate in a rearward direction when in tension, two laterally-spaced arms pivotally connected at their upper ends to the tractor frame and at their lower ends to the rear ends of the respective springs, two lower hitch links universally connected at their front ends to the lower ends of the respective arms, and a draft signal transmitting member adapted to control automatically the power lift mechanism by way of a linkage, is characterised in that a laterally extending summating bar is universally connected at its ends to the respective arms, and the draft signal transmitting member is actuated by the summating bar at a point between the ends of said bar.

BRIEF DESCRIPTION OF DRAWINGS

A preferred embodiment of the invention will now be described, by way of example, with reference to the accompanying drawings of which:

FIG. 5 is a side elevation, in the direction of the arrow 5 in FIG. 4, of parts of the system on a considerably larger scale; and FIG. 6 is a sectional plan view on the line 6—6 in FIG. 5, and on the same scale as FIG. 5.

DESCRIPTION OF PREFERRED EMBODIMENT

Figure 1:
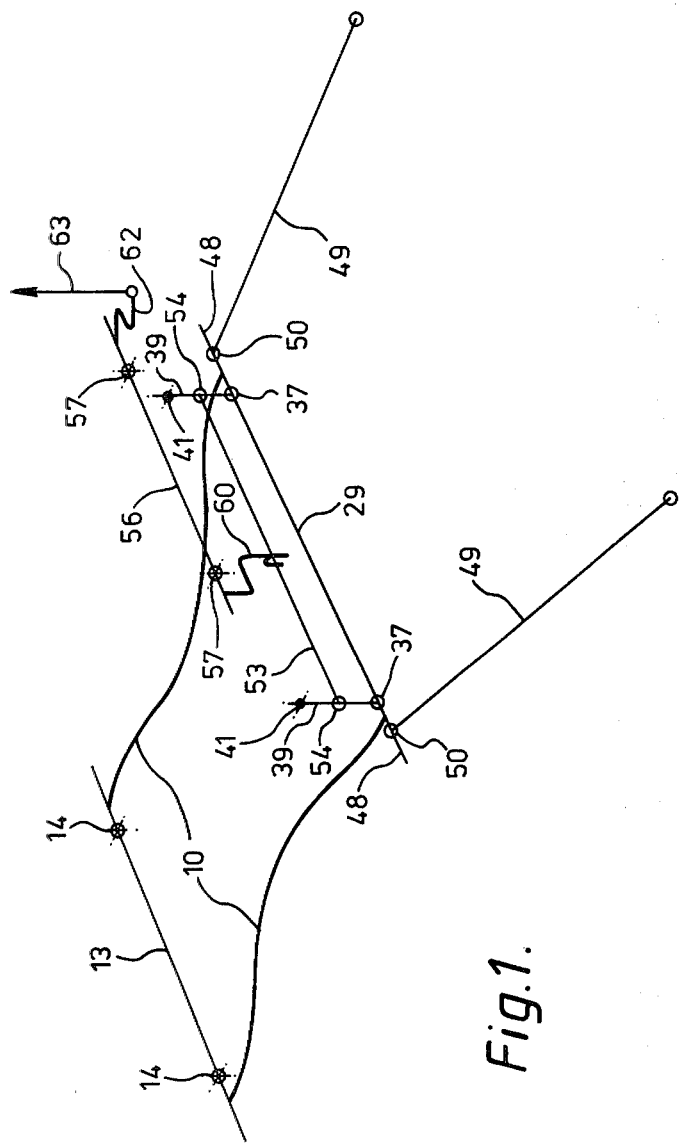
FIG. 1 is a highly diagrammatic perspective view of the principal parts of a tractor lower link draft sensing system.

Referring now to the drawings, a lower link draft sensing system, for an agricultural tractor having a hydraulic power lift mechanism, comprises two inwardly bowed longitudinally-extending leaf springs 10 which are spaced apart laterally so that said springs are substantially parallel to one another. At their front ends, the springs 10 are anchored beneath the tractor frame 11 by means permitting their fore and aft adjustement. Said means comprise two bushes 12 disposed near the respective ends of a laterally-extending spindle 13 and having part-spherical inner end zones 14 engaging universally in cylindrical bores 15 in respective depending brackets 16 rigidly secured to the underside of the tractor frame 11. Each bush 12 has an eccentric spigot 17 at its outer end which fits closely in a hole 18 in the front end of the associated spring 10, and that part 19 of the periphery of the bush 12 immediately adjacent the spigot 17 is hexagonal. A plate 20 having a hexagonal hole 21 fits on the part 19 of the periphery of the bush 12, and has an arcuate slot 22 concentric with the spindle 13. A bolt 23 passes through a hole 24 near the front end of the associated spring 10 and with substantial clearance through the slot 22, and carries a nut 25. For clarity in the smaller scale Figs., the parts 20 to 25 inclusive are shown only in the larger scale FIGS. 5 and 6. At each end of the spindle 13 there is a screw-threaded zone 26 which carries a plain washer 27 and a self-locking nut 28. When all the aforementioned nuts are slack, the springs 10 can be adjusted in a fore and aft direction by appropriate angular movement of the bushes 12 after which each bush 12 is clamped axially to the associated spring 10 by the associated self-locking nut 28 and is clamped in rotateably adjusted position relative to said spring by the nut 25 on the bolt 23 passing through the associated arcuate slot 22. The universal connection of the spindle 13 to the tractor frame 11 at laterally-spaced points inboard of the springs 10 by way of the part-spherical zones 14 of the bushes 12 and the cylindrical bores 15 in the brackets 16 enables the spindle 13 to bend freely and thus complement the extension of the springs 10 when said springs are in tension as hereinafter described.

Figure 4:
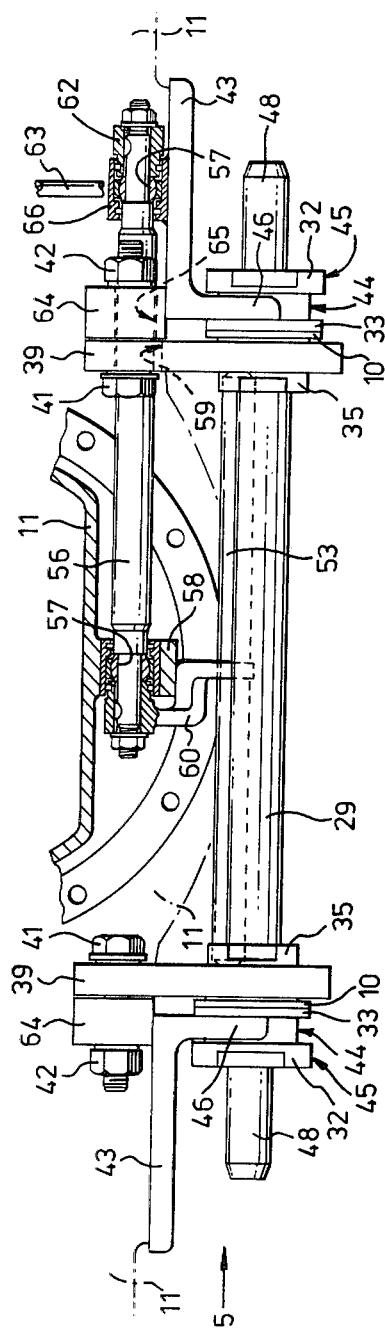
FIG. 4 is a rear elevation of the system with parts broken away for clarity, on the same scale as FIG. 3.

As best seen in FIG. 6, at their rear ends the springs 10 are secured near the respective ends of a cross-bar 29, each of said springs having a hole 30 which is a close fit on the smallest diameter, innermost zone 31 of a stepped bush 32 secured near the associated end of the cross-bar 29. The spring 10 is clamped between a spacer 33 abutting against a shoulder 34 on the bush 32 and a nut 35 engaging a screw-threaded end portion 36 of the zone 31, and the nut 35 has a part-spherical zone 37 on its periphery engaging universally in a cylindrical hole 38 in the lower end of a short arm 39 which is pivotally connected at its upper end by a bush 40, a bolt 41 and a nut 42 to a lug 64 on a bracket 43 rigidly secured to the tractor frame 11. The intermediate diameter zone 44 of the stepped bush 32 is disposed near the outer end of said bush and between shoulders formed respectively by the largest diameter, outermost zone 45 of the bush 32 and the afore-mentioned spacer 33. A bifurcated downward extension 46 of the bracket 43 embraces the intermediate diameter zone 44 with substantial fore and aft clearance, say 6 mm in total, so as to form stops 47 limiting fore and aft movement of the cross-bar 29. The cantilevered ends of the cross-bar 29 constitute respective attachment points 48 for the front ends of a pair of lower hitch links 49 (not shown in FIGS. 4, 5 and 6) having conventional captive ball joints 50 at their ends, and having diametrical holes 51 to receive the usual linch pins (not shown) for retaining the links 49 on the attachment points 48. As the links 49 are attached to the cross-bar 29 outboard of the arms 39 and of the springs 10, they are readily removeable if desired.

Figure 2:
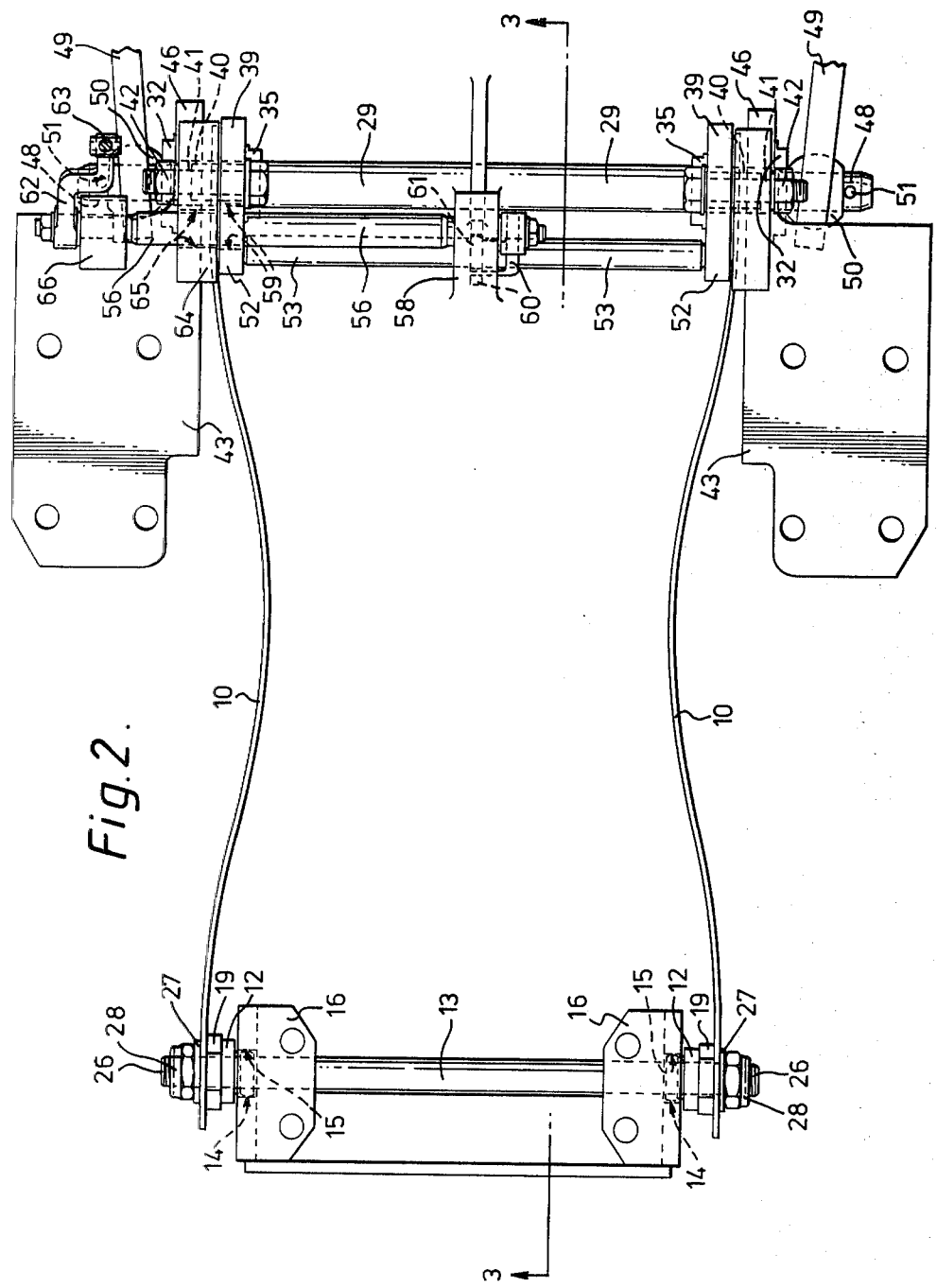
FIG. 2 is a plan view of the system.
Figure 3:
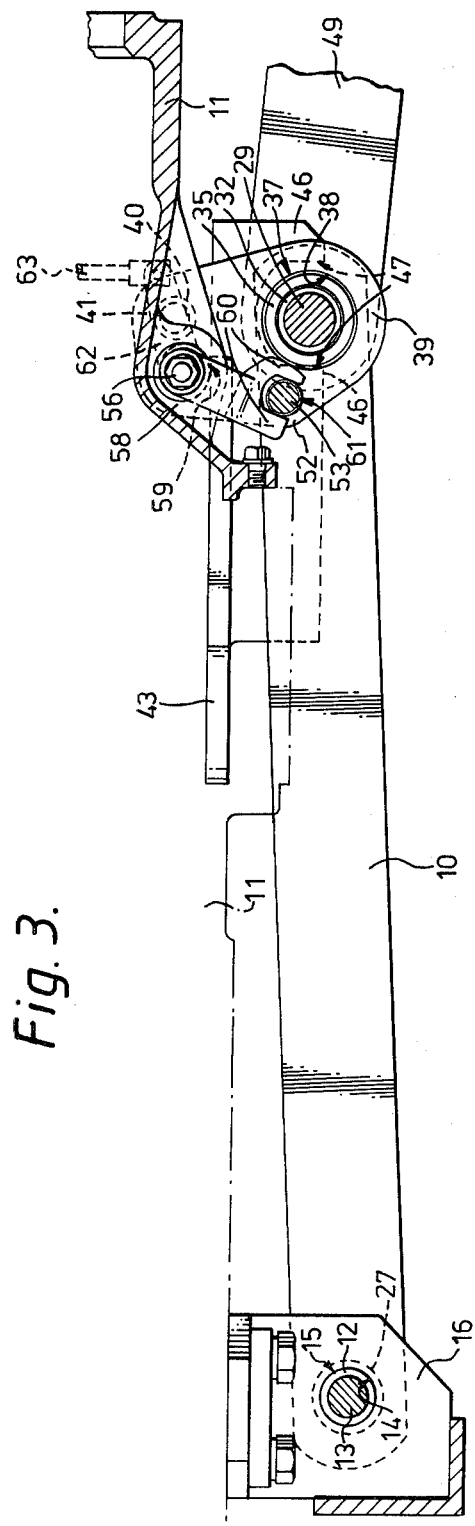
FIG. 3 is a sectional side elevation on the line 3—3 in FIG. 2, on a slightly larger scale.

The two arms 39 have respective projections 52 extending forwardly of the cross-bar 29, and a laterally-extending summating bar 53 is universally connected between the projections 52 for which purpose it is provided with part-spherical ends 54 (see FIG. 6) each of which engages universally in a cylindrical hole 55 in the associated projection 52, the summating bar 53 being parallel to the cross-bar 29. A transverse shaft 56 is journalled near its ends in spaced-apart self-aligning part-spherical bearings 57 (see FIG. 4) one of which is carried by a lug 58 projecting from the underside of the tractor frame 11 on the longitudinal centre-line of the draft sensing system and the other of which is carried by a block 66 secured to the right hand one of the brackets 43. The right hand one of the arms 39 has a hole 59 through which the shaft 56 passes with sufficient clearance to enable said arm to pivot without hindrance about its associated bolt 41. The right hand one of the lugs 64 also has a clearance hole 65 through which the shaft 56 passes. An arm 60 rigidly secured to that end of the shaft 56 adjacent the longitudinal centre-line of the draft sensing system is bifurcated so as to embrace a part-spherical zone 61 (see FIGS. 2 and 3) of the summating bar 53 and cranked so that its point of contact with said bar in alignment, longitudinally of the tractor, with the bearing 57 carried by the lug 58. Another arm 62 rigidly secured to the other end of the shaft 56 extends rearwards and is pivotally connected at its free end to a vertical rod 63 which forms parts of a linkage for automatically controlling the power lift mechanism. The arm 62 is cranked so that its point of connection to the rod 63 is in alignment, longitudinally of the tractor, with the bearing 57 carried by the block 66. The shaft 56 and its arms 60 and 62 constitute a draft signal transmitting member, and said arms are cranked as aforesaid in order to avoid any bending stress in the shaft 56.

The bushes 12 connecting the front ends of the springs 10 to the brackets 16 secured to the tractor frame 11 are angularly adjusted as aforesaid until the intermediate diameter zones 44 of the bushes 32 on the cross-bar 29 just contact the stops 47 formed by the front arms of the bifurcated downward extensions 46 of the brackets 43, as best seen in FIG. 6. However, the adjustment can be employed to pre-load the springs 10 if so desired.

In operation with, for example, a plough connected to the rear ends of the two lower hitch links 49 and of a conventional central, upper hitch link (not shown), an asymmetrical draft force is exerted on the tractor by the plough when in work and the tension in and consequent elongation of one spring 10 differs from the tension in and consequent elongation of the other spring 10. In addition, said draft force tends to bend the cross-bar 29 due to the connection of the lower hitch links 49 to the attachment points 48 on the cross-bar 29, which points are outboard of the arms 39 supporting said cross-bar. The arms 39, and thus the ends of the summating bar 53, move rearwardly through different distances proportional to the respective tensions in the associated springs 10, but the summating bar 53 is so connected to the arms 39 that it cannot be stressed in bending by the draft force. A draft signal accurately related to the average value of said tensions therefore passes continuously from the mid-point of the summating bar 53 to the draft signal transmitting member 56, 60, 62, which actuates the vertical rod 63 forming part of the control linkage for the power lift mechanism and thereby causes the working depth of the plough to be automatically varied so as to maintain the draft force substantially constant.

In a modification intended to compensate for unduly different tensions in the springs, the point of contact between the draft signal transmitting member and the summating bar is laterally adjustable. In another modification, the summating bar is disposed to the rear of the cross-bar, the draft signal transmitting member constitutes a Bowden cable, and the vertical rod is omitted. In a further modification, the front ends of the springs converge and are anchored to the tractor frame at a common point on the longitudinal centre-line of the draft sensing system.

We claim:

1. A lower link draft sensing system, on an agricultural tractor having a hydraulic power lift mechanism, comprising two bowed rearwardly-extending leaf springs anchored to the tractor frame at their front ends and adapted to elongate in a rearward direction when under tension, two laterally-spaced arms pivotally connected at their upper ends to the tractor frame and universally connected at their lower ends to a cross-bar secured between the rear ends of the respective springs, two lower hitch links universally connected at their front ends to points on the cross-bar which points are laterally offset from said arms, a laterally-extending unstressed summating bar universally connected at its ends to the respective arms and disposed in parallel relationship to the cross-bar, and a draft signal transmitting member actuated by the summating bar at a point between the ends of said bar and adapted to control automatically the power lift mechanism by way of linkage.

2. A lower link draft sensing system according to claim 1, wherein the front ends of the lower hitch links are universally connected to respective cantilevered ends of the cross-bar so that the points are outboard of said arms and springs.

3. A lower link draft sensing system according to claim 1, wherein the front ends of the springs are spaced apart laterally so that said springs are substantially parallel to one another.

4. A lower link draft sensing system according to claim 3, wherein the front ends of the springs are anchored to the tractor frame by securing them to the ends of a laterally-extending spindle universally mounted in the tractor frame at laterally-spaced points inboard of the springs, the spindle being free to bend so as to complement the extension of the springs when said springs are under tension.

5. A lower link draft sensing system according to claim 1, wherein the draft signal transmitting member comprises a transverse shaft rotateably mounted on the tractor frame and having secured to it a bifurcated arm which embraces the summating bar and another arm which is pivotally connected to the linkage for automatically controlling the power lift mechanism.

6. A lower link draft sensing system according to claim 5, wherein the arms secured to the transverse shaft are cranked so that the respective points at which one of them embraces the summating bar and the other of them is connected to the linkage are in alignment, longitudinally of the tractor, with two spaced-apart self-aligning bearings in which the shaft is rotateable.

* * * * *